June 28, 1938. V. VOORHEES 2,122,076
FUELING SYSTEM
Filed May 20, 1935
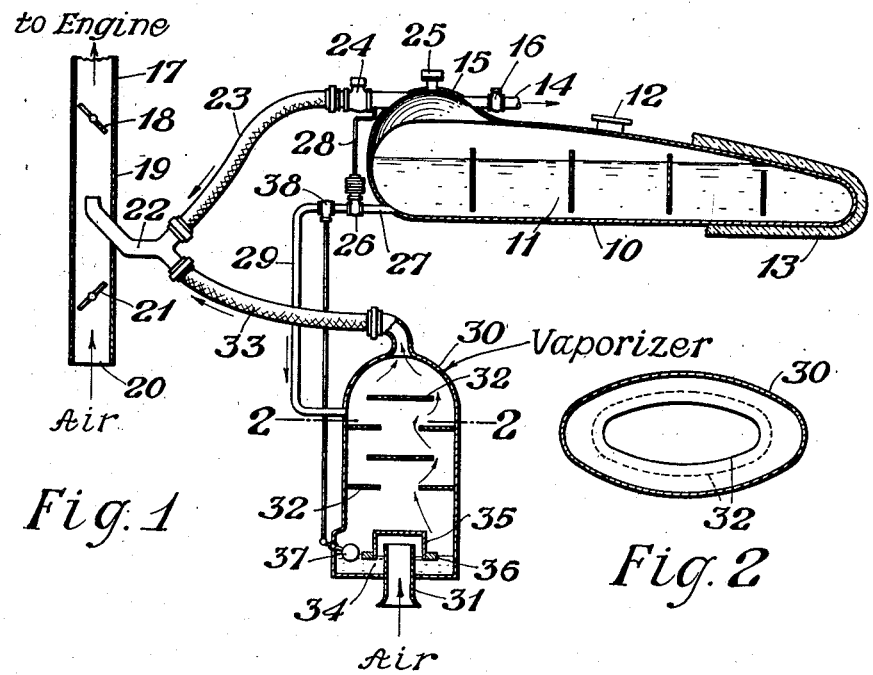
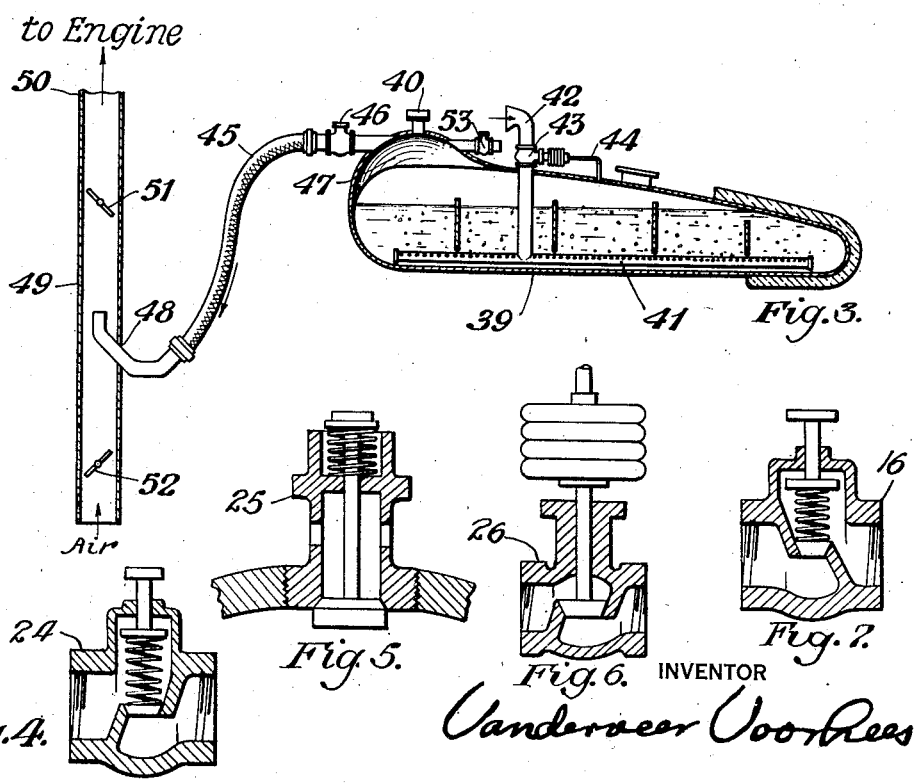
INVENTOR
Vanderveer Voorhees Patented June 28, 1938

2,122,076

UNITED STATES PATENT OFFICE 2,122,076

FUELING SYSTEM

Vanderveer Voorhees, Hammond, Ind., assignor to Standard Oil Company, Chicago, Ill., a corporation of Indiana Application May 20, 1935, Serial No. 22,490

10 Claims. (Cl. 261—16)

This invention relates to a method of storing and transporting liquid fuels for internal combustion engines and more particularly to the transportation of liquefied hydrocarbon gases for use in gas engine propelled vehicles, particularly aircraft. An object of the invention is to provide a means for transporting liquefied hydrocarbon gases, particularly butane, propane, butylene and propylene, as fuel for gas engines without the use of high pressure to maintain the fuel in the liquid condition. A special object of the invention is to maintain the liquid fuel at a temperature below its boiling point by refrigerating means and thus permit the use of containers of light construction such for example as the light weight metal low pressure tanks usually employed on aircraft, where the weight would otherwise be prohibitive if the liquefied gas were required to be maintained under pressure.

Another object of the invention is to provide automatic vaporizing means for regulating the evaporation of the fuel to provide the minimum wastage and at the same time avoid a deficiency of fuel when required by the engine.

Still another object of the invention is to provide more efficient combustion of fuel for aviation service where efficiency is at a high premium because of the weight factor. It has been found that gaseous fuels can be utilized in a gas engine with considerably higher efficiency than is obtained with liquid fuels which must be carbureted. With liquid fuels such as gasoline it is necessary to employ a weight ratio of air to fuel of about 12 or 13 to 1, although the ratio for maximum economy is about 15 to 1. This loss in efficiency is attributed principally to the difficulty of obtaining complete vaporization of the liquid fuel and mixing it with air, without which uniform distribution and uniform combustion is impossible. Using a gaseous fuel such as propane or butane it is possible to use a ratio of 15 to 1, or even as high as 17 to 1, which is the theoretical ratio, without difficulty from poor distribution and incomplete combustion.

The invention will be fully understood by reference to the accompanying drawing which forms a part of this specification in which is shown the adaptation of the invention to an airplane or other heavier than air machine. Fig. 1 is a diagrammatic outline, partly in section, showing the arrangement of fuel tank and vaporizer with connections to the engine inlet mixing valve. Fig. 2 is a cross section of the vaporizer taken on the line 2—2 of Fig. 1. Fig. 3 is an alternative form of my invention in which the vaporizer is combined with the fuel tank. Fig. 4 is a diagrammatic detail of loaded check valve 24 of Fig. 1 and valve 46 of Fig. 3. Fig. 5 is a diagrammatic detail of safety vacuum release valve 25 of Fig. 1 and valve 40 of Fig. 3. Fig. 6 is a diagrammatic detail of diaphragm valve 26 of Fig. 1 and valve 43 of Fig. 3. Fig. 7 is a diagrammatic detail of release valve 16 of Fig. 1 and valve 53 of Fig. 3.

Referring to Fig. 1, the fuel tank 10 may be substantially filled with liquid propane 11 by introducing the refrigerated liquid through filler opening 12, the opening being thereafter closed by a suitable cap. In charging the fuel tank in this manner it is desirable to have the fuel precooled to a temperature well below its boiling point to thereby avoid as much as possible loss of fuel by vaporization. For the same reason it is desirable to precool the fuel tank by refrigeration with liquid propane which may be recovered as gas or by the use of any other suitable refrigerating liquid.

A light weight metal low pressure fuel tank 10 is suitably insulated with a layer of porous insulation 13 to prevent the ready access of heat. A vent line 14 leads from the vapor dome 15 to a point on the vehicle where the discharge of inflammable gas will cause little or no fire hazard. Pressure release valve 16 in line 14 serves to prevent the access of air to the fuel tank but permits the escape of vapors at any desired low pressure, for example, two inches hydrostatic water pressure may suitably be maintained. Valve 16 may be the common spring loaded type escape and check valve preventing the flow of fluid into the tank through line 14 and permitting egress outwardly from the tank through line 14 when the pressure in the tank exceeds the amount required to open the valve.

As fuel gas is required by the engine it is drawn through intake line 17 past throttle valve 18 from mixer 19. Air is admitted through opening 20 past choke valve 21 in the amount required to give satisfactory combustion. Usually about 20 to 25 volumes of air to 1 volume of butane gas is required.

The suction created by the engine produces a reduction in the pressure of mixer 19 below atmospheric pressure, thus drawing fuel gas through gas intake 22 connected by conduit 23 to loaded check valve 24 connected to the gas dome 15 of fuel tank 10. Valve 24 may be similar to valve 16 permitting egress of vapors from the tank through line 23, but preventing movement of vapor in the opposite direction. The reduction in pressure set up by the engine suction applied to the fuel tank causes the evaporation of propane contained in the tank with resulting refrigeration. The check valve 24 prevents pressure being placed accidentally upon the fuel tank as a result of backfire or from other cause. Valve 24 is also loaded sufficiently to maintain a back pressure on tank 10 slightly greater than the escape pressure on valve 16, thereby preventing gas entering conduit 23 when the engine is not in operation. When the engine is in operation and exerting suction on line 23, valve 24, by virtue of this suction, will open before valve 16. Safety vacuum valve 25 is provided for admitting air to tank 10 in case the pressure therein should, for any reason, fall to a point where it may threaten collapse of the tank walls. Valve 25 is similar to and has the same function as valves 16 and 24 except that it will act in the reverse direction, admitting air to fuel tank 10 when the pressure within the tank falls below a definite amount. Egress of vapor through valve 25 is completely checked. The construction of valves 16, 24 and 25 is well known in the art and need not be described in detail.

Although the amount of evaporation of fuel from tank 10 due to ingress of heat through insulation 13 will usually be sufficient to provide the proper amount of gas required by the engine in ordinary service, under certain conditions there will be a deficiency of gas, in which case I have provided additional means for vaporizing further quantities or fuel as needed. When the above conditions prevail, such as when the vehicle is operated under conditions of low atmospheric temperature or for prolonged periods of time at full throttle, the pressure in tank 10 will fall to a point below which it is considered unsafe to subject the tank. This pressure will be slightly above the pressure at which valve 25 is set to operate. At this pressure, diaphragm operated valve 26 in line 27 leading from the bottom of fuel tank 10 automatically opens as a result of the reduced pressure acting thereon through line 28. Valve 26 is suitably of the type containing a gate or disk actuated by a diaphragm, the gate being closed when pressure acting through line 28 depresses the diaphragm. This permits liquid fuel to flow through line 29 and into the upper portion of vaporizer 30 where the fuel comes in contact with a stream of air admitted to the vaporizer by inlet 31 as hereinafter described. Baffles 32 provide surface for evaporation of the liquefied gas and the resulting mixture of gas and air is conducted by conduit 33 to gas inlet 22 and thence to mixer 19. When the liquid admitted to vaporizer 30 has collected in trough 34 to a small depth, the air valve plate 35, with dependent annular float 36, opens to admit air which escapes under the float, becoming saturated with fuel gas thereby.

If for any reason an excessive quantity of liquid fuel is admitted to vaporizer 30 it will accumulate in the trough 34 surrounding vapor inlet 31. Liquid accumulating in this trough above a certain depth acts on float 37 connected to valve 38 which automatically shuts off the flow of liquefied gas therethrough until the level of the liquid accumulating in trough 34 has been substantially reduced.

If at any time during the operation of the vaporizer the pressure of the gas accumulating in tank 10 reaches a point where it is again sufficient to supply the engine, automatic valve 26 will close and permit the engine to draw its fuel gas supply directly from the tank.

The vaporizer 30 may suitably be constructed in the form of an ellipse, as shown in Fig. 2, in order to diminish wind resistance.

In another modification of my invention shown in Fig. 3 the fuel tank 39, provided with vacuum release valve 40, contains a perforated air distributor 41 connected to air inlet 42 and controlled by valve 43. The valve 43 is actuated in turn by the pressure of the vapors in the tank 39 acting through line 44.

As in the previous modification, vapors are conducted by line 45 to loaded check valve 46 from vapor dome 47 to fuel inlet 48 and mixing chamber 49 leading to engine manifold inlet 50. Throttle valve 51 controls the quantity of fuel and air mixture applied to the engine and choke valve 52 controls the quality of the mixture. The construction and action of valves 40 and 46 is substantially the same as that of previously described valves 25 and 24 respectively. Valve 43 is suitably of the diaphragm type wherein the closure member of the valve is actuated by a movable diaphragm whose movement is responsive to variations in pressure in line 44, a decrease in pressure in line 44 resulting in opening of the valve.

In the operation of this modification the vapors generated in tank 39 by the evaporation of propane or butane therein fill the vapor space above the liquid and vapor dome 47. When the pressure exceeds atmospheric or a pressure slightly above atmospheric, the vapors are released to the atmosphere by pressure release valve 53 which is set to release at a pressure slightly below that of valve 46.

When the engine is operating at normal load the amount of vapor produced by the evaporation of the fuel in tank 39 is approximately sufficient to maintain operation of the engine. Should the demand for fuel exceed the amount of vapor produced, however, the pressure in the vapor space of tank 39 will fall several hydrostatic inches. At a given reduction in pressure, valve 43 is automatically opened by the action of the reduced pressure in line 44, thus permitting air to enter through inlet 42 connected to distributor 41. The air thus admitted rises through the fuel and causes evaporation thereof at a much increased rate, thereby compensating for the reduction in fuel requirement of the engine. In order to facilitate introduction of air, the inlet 42 may be provided with a funnel facing in the direction of the air stream. Compressed air or air from any other source may equally well be employed. Exhaust gases from the engine, after proper cooling, may also be used. If desired, my fueling system may be used on supercharged engines in which case the supercharger is preferably located beyond the throttle valve and connected to line 17 in Fig. 1, or line 50 in Fig. 3.

My improved system of fuel transportation is especially adapted for the fueling of airplanes and heavier than air aeronautic machines in general. My system of fueling provides such machines with a completely vaporized gaseous fuel of substantially uniform characteristics which may be burned with greater efficiency than liquid fuels heretofore used. Furthermore, I am enabled to conduct fuel gas from the fuel reservoir to the engine and through lines which carry no liquid and which are therefore free from trouble due to accidental leakage. I am thus able to overcome difficulties from accidental fuel shortage due to leakage and failure of fuel lines which commonly occur with the use of liquid fuels. I have also overcome the hazard of handling liquid fuels in carburetor systems closely connected to the engine. By the device of gasifying the fuel in the fuel tank rather than in a carburetor attached to the engine I have reduced the amount of inflammable fuel in the location of the engine to a minimum quantity, thereby reducing the present hazard of fires caused by backfire in carburetors.

As previously indicated, I may use liquid propane and liquid butane as preferred fuels. The former compound has a boiling point of −38° F., at which temperature it exerts a vapor pressure of substantially 1 atmosphere; the latter compound has a boiling point of +34° F. I may use mixtures of these hydrocarbons with each other or with other gaseous hydrocarbons, if desired. When employing liquid propane as a fuel the amount of insulation required for the fuel tank should be increased over that required for the use of liquid butane. I may also employ liquid propane in the winter season and liquid butane in the summer season, using the same equipment.

Although I have described my invention with respect to specific applications thereof, it should be construed as broadly as possible in accordance with the following claims.

I claim:

1. The method of supplying normally gaseous hydrocarbon fuel in variable amounts to an airplane engine, which comprises maintaining a supply of said gaseous hydrocarbon fuel in liquefied form in a light weight metal low pressure tank, maintaining a vapor space above said liquid in said tank to provide for evaporation of said liquid fuel, maintaining approximately atmospheric pressure within said vapor space, withdrawing vapors from said vapor space as required by said engine, said withdrawal of vapors being effective to cause further vaporization of said liquid hydrocarbon, said vaporization being effective to cool the remaining liquid hydrocarbon and maintain it in the liquid state at said low pressure, and supplementing said vapors, when insufficient to supply the need of said engine, by evaporating additional amounts of said liquid hydrocarbon beyond the amount normally evaporating in said fuel tank.

2. An arrangement of means for storing a liquefied normally gaseous hydrocarbon and gasifying the same for use as fuel for an airplane engine, which means makes possible the storage of said fuel in a light weight metal low pressure tank of the type necessarily employed on an airplane, said arrangement of means comprising a light weight metal low pressure tank, the lower portion of said tank providing a storage space for said liquefied gaseous hydrocarbon fuel, the upper portion of said tank defining a vapor space above said liquid in said tank to provide for the evaporation of said liquid fuel, means responsive to a predetermined pressure of the order of one atmosphere absolute within said vapor space for venting the same to the atmosphere, means responsive to a predetermined drop in pressure within said vapor space below the pressure for which said first named venting means is set for admitting air to said vapor space, means for withdrawing vapors from said vapor space as needed for engine fuel, said withdrawal of vapor being effective to cause further vaporization, said vaporization being effective to control the temperature of the remaining liquid whereby to maintain the same in a liquid state, at said low pressures of the order of one atmosphere, said pressures being well within the liberal factor of safety for said light weight type of tank against collapse and rupture and means for supplementing said vapors when insufficient by evaporating additional amounts of said liquid fuel beyond the amount normally evaporating in said fuel tank.

3. An arrangement of means for storing a liquefied normally gaseous hydrocarbon fuel and gasifying the same for use in an airplane engine, said arrangement of means being such as to make possible the storage of said liquefied fuel in a light weight metal low pressure type of tank, said arrangement of means comprising a light weight metal low pressure tank, the lower portion of said tank providing a storage space for said liquefied gaseous hydrocarbon fuel, the upper portion of said tank forming a vapor space above said body of liquid to provide for vaporization of said liquid, relief valve means responsive to a predetermined pressure of the order of one atmosphere, absolute, within said vapor space for venting the same, conduit means leading from said vapor space to the engine fuel inlet and adapted to receive suction therefrom, a check valve means within said conduit, said check valve being set to exert a predetermined back pressure on said vapor space, said back pressure being greater than the pressure for which said vent valve means is set when there is no suction on said engine fuel inlet, and less than the pressure for which said vent valve is set to operate when there is normal suction on said fuel inlet, valve means operable responsive to a predetermined drop in pressure within said vapor space to admit air to prevent the collapse of said tank, said last named pressure being below the normal pressure at which said withdrawal means operates but within a liberal safety factor for said light weight tank, said withdrawal of vapor being effective to cause further vaporization of said liquid, said vaporization being effective to cool the remaining liquid whereby to maintain the same in a liquid state at said low pressures.

4. An arrangement of means for storing a liquefied normally gaseous hydrocarbon fuel and gasifying the same for use as fuel for an airplane engine, said arrangement of means being such as to make possible the storage of said liquefied fuel in a light weight metal low pressure type of tank, said arrangement of means comprising a light weight metal low pressure tank, the lower portion of said tank providing a storage space for said liquefied gaseous hydrocarbon fuel, the upper portion of said tank forming a vapor space above said body of liquid to provide for vaporization of said liquid, pressure relief valve means responsive to a predetermined pressure of the order of one atmosphere, absolute, within said vapor space for venting same to prevent rupture of said light weight tank, vacuum relief valve means responsive to a predetermined drop in pressure within said tank for admitting air thereto for preventing collapse of said tank, conduit means communicating with the engine fuel inlet for withdrawing vapor from said vapor space at pressures between the pressures for which said first and second named valve means are set to operate, means for effecting additional vaporization of said liquid, means responsive to a predetermined pressure drop within said vapor space, indicating a deficiency of vapor therein, for operating said additional vaporizing means, said last named pressure being above the pressure for which said second named relief valve means is set to operate.

5. A method of storing a liquefied normally gaseous hydrocarbon and gasifying the same for use as an airplane engine fuel, which method makes possible the storage of said fuel in a relatively light weight metal low pressure type of tank, said method comprising confining a body of liquefied normally gaseous hydrocarbon in said tank, maintaining a vapor space in said tank above said liquid at approximately atmospheric pressure to provide for vaporization of said liquid fuel, withdrawing vapors from said vapor space to be used as fuel, said withdrawal of vapor causing additional vaporization, said vaporization at said low pressure being effective to cool the remaining liquid whereby to maintain the same in a liquid state at said low pressure, withdrawing liquid from said tank under circumstances where said vaporization is insufficient to supply the amount of fuel required by said engine, vaporizing said withdrawn liquid fuel and supplementing therewith said vapors withdrawn from said vapor space.

6. An arrangement of means for storing a liquefied normally gaseous hydrocarbon and gasifying the same for use as fuel for an airplane engine, which means makes possible the storage of said liquefied fuel in a light weight metal low pressure type of tank, said arrangement of means comprising a tank adapted to contain a body of liquefied normally gaseous hydrocarbon fuel, the upper portion of said tank forming a vapor space above said body of liquid to provide for vaporization of said liquid, a first valve means responsive to the occurrence of a predetermined pressure of the order of one atmosphere, absolute, in said vapor space for venting the same to prevent rupture of said light weight tank, a second valve means responsive to a predetermined drop in pressure within said vapor space for admitting air to prevent the collapse of said tank, conduit means communicating with the fuel inlet of the engine for withdrawing vapor from said vapor space at pressures between the pressures for which said first and second named valve means are set to operate, means for effecting additional vaporization of said liquid comprising an auxiliary vaporizer, means responsive to a predetermined pressure drop within said vapor space less than that required to operate said second named valve means for effecting withdrawal of liquid from said tank into said auxiliary vaporizer, said auxiliary vaporizer being effective to vaporize said liquid and to supplement therewith the vapor withdrawn from said vapor space.

7. The structure as defined in claim 6 wherein there is provided means responsive to a predetermined level of liquid within said auxiliary vaporizer for interrupting the flow of liquid through said withdrawing means.

8. An arrangement of means for storing a liquefied normally gaseous hydrocarbon fuel and gasifying the same for use in an airplane engine, said arrangement of means being such as to make possible the storage of said liquefied fuel in a light weight metal low pressure type tank suitable for use on an airplane, said arrangement of means comprising a tank adapted to contain a body of liquefied normally gaseous hydrocarbon fuel, the upper portion of said tank forming a vapor space above said body of liquid to provide for vaporization of said liquid, pressure relief valve means responsive to the occurrence of a predetermined pressure of the order of one atmosphere, absolute, in said vapor space for venting the same to prevent rupture of said light weight tank, conduit means communicating with the engine fuel inlet for withdrawing vapor from said vapor space for fuel, means responsive to a predetermined pressure drop within said tank, indicating an insufficient quantity of vapor in said vapor space to supply the fuel demand, for causing air to be passed into intimate contact with said liquid for producing additional vaporization thereof, said vaporization being effective to cool the remaining body of liquid whereby to maintain it in a liquid state while subjected to said low pressures of the order of one atmosphere.

9. An arrangement of means for storing a liquefied normally gaseous hydrocarbon fuel and gasifying the same for use in an airplane engine, said arrangement of means being such as to make possible the storage of said liquefied fuel in a light weight metal low pressure type of tank, said arrangement of means comprising a tank adapted to contain a body of liquefied normally gaseous hydrocarbon fuel, the upper portion of said tank forming a vapor space above said body of liquid to provide for vaporization of said liquid, pressure relief valve means responsive to the occurrence of a predetermined pressure of the order of one atmosphere, absolute, in said vapor space for venting the same to prevent rupture of said light weight tank, vacuum valve means responsive to a predetermined drop in pressure within said vapor space for admitting air to prevent collapse of said tank, conduit means communicating with the engine fuel inlet for withdrawing vapor from said vapor space at pressures between the pressures for which said valve means are set to operate, means for effecting additional vaporization of said liquid, said means comprising means for passing air under pressure through said body of liquid, means responsive to a predetermined drop in pressure within said vapor space, indicating a deficiency of vapor therein, for operating said means for passing air through said body of liquid, said pressure at which said additional vaporizing means operates being greater than the pressure at which said vacuum valve means is set to operate.

10. In the process of supplying fuel gas at a variable rate by the vaporization of a liquefied normally gaseous hydrocarbon selected from the class consisting of propane and butane, the improvement comprising maintaining said liquefied gas in a light weight, low pressure type storage reservoir at a temperature substantially no higher than its boiling temperature, venting gas from said reservoir at a maximum pressure slightly above atmospheric pressure, admitting air to said reservoir at a minimum pressure slightly below atmospheric pressure, withdrawing vapor from said reservoir as desired, whereby the pressure of the vapors within said reservoir is reduced and when the pressure within said reservoir approaches the said minimum pressure, supplementing said withdrawn vapor by evaporating additional amounts of said liquefied gas until the vapor normally generated within said reservoir is sufficient to supply the amount of gas desired.

VANDERVEER VOORHEES.